United States Patent
Hai (10) Patent No.: US 10,746,628 B2
(45) Date of Patent: Aug. 18, 2020

(54) METHOD OF MEASURING OPTICAL PARAMETERS OF POLARIZER AND MEASURING DEVICE

(71) Applicant: HUIZHOU CHINA STAR OPTOELECTRONICS TECHNOLOGY CO., LTD., Huizhou Guangdong (CN)

(72) Inventor: Bo Hai, Huizhou Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 361 days.

(21) Appl. No.: 15/752,425

(22) PCT Filed: Jan. 18, 2018

(86) PCT No.: PCT/CN2018/073212
§ 371 (c)(1),
(2) Date: Feb. 13, 2018

(87) PCT Pub. No.: WO2019/127735
PCT Pub. Date: Jul. 4, 2019

(65) Prior Publication Data
US 2020/0132569 A1 Apr. 30, 2020

(30) Foreign Application Priority Data

Dec. 29, 2017 (CN) .......................... 2017 1 1483432

(51) Int. Cl.
*G01J 4/00* (2006.01)
*G01M 11/02* (2006.01)
(Continued)

(52) U.S. Cl.
CPC ....... *G01M 11/0207* (2013.01); *G02F 1/1335* (2013.01); *G02B 5/3025* (2013.01)

(58) Field of Classification Search
CPC ...... G02B 5/30; G02B 5/3025; G02B 5/3083; G02B 6/0056; G02F 1/133634;
(Continued)

(56) References Cited

U.S. PATENT DOCUMENTS 5,005,977 A * 4/1991 Tomoff .................... G01J 4/04
356/367
5,357,342 A * 10/1994 Decker .................... G01J 4/00
356/364
(Continued)

FOREIGN PATENT DOCUMENTS

CN 1904672 A 1/2007
CN 101097301 A 1/2008
(Continued)

*Primary Examiner* — Hoa Q Pham
(74) *Attorney, Agent, or Firm* — Hemisphere Law, PLLC; Zhigang Ma (57) ABSTRACT

The disclosure discloses a method of measuring optical parameters of a polarizer and a measuring device. The polarizer includes a compensation film and a PVA layer. The measuring method includes the following steps. In the first state, providing an incident linearly polarized light sequentially to pass through the compensation film and the PVA layer, acquiring a first measurement parameter and a second measurement parameter when the brightness of the light emitted from the polarizer is lowest and is highest. In the second state, providing the incident linearly polarized light sequentially to pass through the PVA layer and the compensation film, acquiring a third measurement parameter and a fourth measurement parameter when the brightness of the light emitted from the polarizer is lowest and is highest; and acquiring optical parameters of the compensation film and/
(Continued)

or the PVA layer in the polarizer according to one or more of the above measurement parameters.

13 Claims, 5 Drawing Sheets

(51) Int. Cl.
*G02F 1/1335* (2006.01)
*G02B 5/30* (2006.01)

(58) Field of Classification Search
CPC ........... G02F 1/133528; G02F 1/13362; G02F 1/0136; G01N 21/23; G01N 21/211; G01N 2021/216; G01N 2021/217; G01N 2021/218
USPC ....... 356/364–369; 250/225, 341.3; 349/117, 349/96
See application file for complete search history.

(56) References Cited

U.S. PATENT DOCUMENTS

| | | | | |
|---|---|---|---|---|
| 6,064,510 A | * | 5/2000 | Gottlieb | G01J 3/2823 356/327 |
| 7,830,511 B2 | * | 11/2010 | Ham | G01N 21/23 250/225 |
| 2006/0087653 A1 | * | 4/2006 | Matsumoto | G01N 21/21 356/369 |
| 2010/0110432 A1 | | 6/2010 | Yamagata et al. | |
| 2012/0182551 A1 | * | 7/2012 | Lo | G01J 4/00 356/364 |
| 2014/0098328 A1 | * | 4/2014 | Kang | G02F 1/133634 349/96 |
| 2018/0172887 A1 | * | 6/2018 | Ko | G02F 1/133536 |

FOREIGN PATENT DOCUMENTS

| | | |
|---|---|---|
| CN | 101221038 A | 7/2008 |
| CN | 101369059 A | 2/2009 |
| CN | 101629871 A | 1/2010 |
| CN | 101806966 A | 8/2010 |
| CN | 102279094 A | 12/2011 |
| CN | 102589845 A | 7/2012 |
| CN | 104237171 A | 12/2014 |
| CN | 205209744 U | 5/2016 |
| CN | 105717674 A | 6/2016 |
| JP | 2006-242617 A | 9/2006 |
| JP | 2014-2019 A | 1/2014 |

\* cited by examiner

METHOD OF MEASURING OPTICAL PARAMETERS OF POLARIZER AND MEASURING DEVICE

RELATED APPLICATIONS

The present application is a National Phase of International Application Number PCT/CN2018/073212, filed Jan. 18, 2018, and claims the priority of China Application No. 201711483432.2, filed Dec. 29, 2017.

FIELD OF THE DISCLOSURE

The present disclosure relates to a polarizer technology field, and more particularly to a method of measuring optical parameters of a polarizer and a measuring device.

BACKGROUND

High-Dynamic Range (HDR) specifications require peak brightness and dark state brightness, the actual requirements for the contrast level and contrast enhancement. Therefore, it is important to increase the contrast of the liquid crystal panel by reducing the dark state transmittance of the polarizer and increasing the polarization degree of the polarizer.

Polarizer is a multi-layer film structure, usually including the PVA layer, the compensation film, etc., affect the polarization degree of the polarizer is not only the core layer of the PVA layer, the compensation film layer will also affect the polarization degree, thus affecting the LCD panel contrast. How to sort out the impact of polarizer film is very important, and only clarify the impact of the film, in order to improve the overall structure to improve and enhance the polarization degree and panel contrast.

Commonly used LCD panel display mode is VA mode, VA display is a vertical alignment of the normally black mode, the upper and lower substrate polarizer absorption axis vertically offset. Polarizers play a crucial role throughout the display. The polarizer absorbs light in a direction perpendicular to the polarization axis and transmits only the light in the polarization axis direction to convert the natural light into linearly polarized light. Such materials are all in the form of films or plates and are therefore often referred to as polarizing films or polarizers.

The dark state brightness affected the contrast of the LCD panel greatly. Specific reference Table 1 shows:

TABLE 1 the effect of the dark state brightness of the LCD on the contrast

| Bright state | 400 | 400 | 400 | 400 | 400 |
|---|---|---|---|---|---|
| Dark state | 0.4 | 0.3 | 0.2 | 0.1 | 0.05 |
| Contrast | 1000 | 1333 | 2000 | 4000 | 8000 |
| Contrast ratio | 100% | 133% | 200% | 400% | 800% |

As can be seen from the table above, the effect of the dark state brightness on the contrast depends on the determinant factor. Therefore, it is important to improve the contrast of the liquid crystal panel by reducing the dark state brightness of the polarizer and increasing the polarization degree of the polarizer.

The main factors that affect the transmittance and the polarization degree of the dark state in the polarizer are the PVA layer and the compensation film. At present, the measurement is the measurement of the polarizer as a whole, and it is impossible to sort out which layer affects the dark state performance.

Therefore, in view of the above technical problem, it is necessary to provide a method of measuring optical parameters of a polarizer and a measuring device.

SUMMARY

In order to overcome the deficiencies of the prior art, an object of the present disclosure is to provide a method of measuring optical parameters of a polarizer and a measuring device to measure the influence of each layer of the polarizer on the optical performance of the polarizer.

In order to achieve the above object, an embodiment of the present disclosure provides the following technical solutions.

A method of measuring optical parameters of a polarizer, wherein the polarizer includes a compensation film and a PVA layer, and the measuring method includes:

in the first state, providing an incident linearly polarized light sequentially to pass through the compensation film and the PVA layer, acquiring a first measurement parameter and a second measurement parameter when the brightness of the light emitted from the polarizer is lowest and is highest;

in the second state, providing the incident linearly polarized light sequentially to pass through the PVA layer and the compensation film, acquiring a third measurement parameter and a fourth measurement parameter when the brightness of the light emitted from the polarizer is lowest and is highest; and acquiring optical parameters of the compensation film and/or the PVA layer in the polarizer according to one or more of the first measurement parameter, the second measurement parameter, the third measurement parameter, and the fourth measurement parameter, the optical parameters include any one or more of dark state brightness, contrast, and polarization degree.

As a further improvement of the present disclosure, the first measurement parameter in the first state includes a dark state brightness $Lv_1$, the second measurement parameter in the first state includes a bright state brightness $Lv_2$; the third measurement parameter in the second state includes a dark state brightness $Lv_3$, and the fourth measurement parameter in the second state includes a bright state brightness $Lv_4$.

As a further improvement of the present disclosure, the optical parameters include any one or more of the following:
the effect of the PVA layer on the dark state brightness is: $Lv_3$;
the effect of the PVA layer and the compensation film on the dark state brightness is: $Lv_1$;
the effect of the compensation film on the dark state brightness is: $Lv_1-Lv_3$;
the effect of the PVA layer on the contrast is: $Lv_4/Lv_3$;
the effect of the PVA layer and the compensation film on the contrast is: $Lv_2/Lv_1$;
the effect of the compensation film on the contrast is: $(Lv_4/Lv_3)-(Lv_2/Lv_1)$;
the effect of the PVA layer on the polarization degree is: $(Lv_4-Lv_3)/(Lv_3+Lv_4)$;
the effect of the PVA layer and the compensation film on the polarization degree is: $(Lv_2-Lv_1)/(Lv_1+Lv_2)$;
the effect of the compensation film on the polarization degree is: $(Lv_4-Lv_3)/(Lv_3+Lv_4)-(Lv_2-Lv_1)/(Lv_1+Lv_2)$.

As a further improvement of the present disclosure, the measuring method further includes:

in the first state, acquiring a first transmission spectrum and a second transmission spectrum when a brightness of light emitted from the polarizer is lowest and is highest; and in the second state, acquiring a third transmission spectrum and a fourth transmission spectrum when a brightness of light emitted from the polarizer is lowest and is highest.

As a further improvement of the present disclosure, the first measurement parameter in the first state includes a dark state transmittance $T_{1\perp}$ and the second measurement parameter in the first state includes a bright state transmittance $T_{2//}$; and the third measurement parameter in the second state includes a dark state transmittance $T_{3\perp}$, and the fourth measurement parameter in the second state includes a bright state transmittance $T_{4//}$.

As a further improvement of the present disclosure, the optical parameters include any one or more of the following: the effect of the PVA layer on the dark state brightness is: $T_{3\perp}$;

the effect of the PVA layer and the compensation film on the dark state brightness is: $T_{1\perp}$;

the effect of the compensation film on the dark state brightness is: $T_{1\perp}-T_{3\perp}$;

the effect of the PVA layer on the polarization degree is: $(T_{4//}-T_{3\perp})/(T_{3\perp}+T_{4//})$;

the effect of the PVA layer and the compensation film on the polarization degree is: $(T_{2//}-T_{1\perp})/(T_{1\perp}+T_{2//})$;

the effect of the compensation film on the polarization degree is: $(T_{4//}-T_{3\perp})(T_{3\perp}+T_{4//})-\sqrt{(T_{2//}-T_{1\perp})/(T_{1\perp}+T_{2//})}$.

As a further improvement of the present disclosure, the polarizer further includes one or more of a substrate layer, a protective layer, and an adhesive layer.

The technical solution provided by another embodiment of the present disclosure is as follows.

A measuring device for optical parameters of a polarizer includes a light source arranged along an optical path, a first stage, a rotatable stage, a second stage, and a brightness meter, wherein the first stage, the rotatable stage, and the second stage are provided with through holes so that the brightness meter can receive light emitted by the light source, the first stage and the second stage are respectively used to carry a standard polarizer, and the rotatable stage is used to bear a polarizer to be measured.

As a further improvement of the present disclosure, the first stage, the rotatable stage and the second stage are respectively provided with a reference edge used for limiting the polarizer placed thereon.

As a further improvement of the present disclosure, the brightness meter is a spectrophotometer.

The measuring device of the disclosure has the advantages of simple structure, simple and easy measuring method, low cost, quickness and convenience.

The disclosure can measure the influence of the compensation film and/or the PVA layer in the polarizer on the brightness, contrast and polarization degree of the polarizer in dark state so as to improve the optical performance of the polarizer in a targeted manner.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION OF PREFERRED EMBODIMENTS

In order to make those skilled in the art better understand the technical solutions in the present disclosure, the technical solutions in the embodiments of the present disclosure are clearly and completely described in the following with reference to the accompanying drawings in the embodiments of the present disclosure. Obviously, the described embodiments are only a part but not all of the embodiments of the present disclosure. All other embodiments obtained by a person of ordinary skill in the art based on the embodiments of the present disclosure without creative efforts shall fall within the protection scope of the present disclosure.

As used herein, terms such as "upper," "lower," etc., denoting relative positions in space, are used to describe the relationship of one element or feature to another element or feature as shown in the drawings for ease of illustration. Terms in space relative position may be intended to include different orientations of the device in use or operation other than those shown in the figures. For example, if the device in the figures is turned over, elements described as 'lower' the other elements or features would be "upper" the other elements or features. Thus, the exemplary term "lower" may encompass both the directions above and below. The device may be otherwise oriented (rotated 90 degrees or at other orientations) and the spatially relative descriptors used herein interpreted accordingly.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present disclosure, the meaning of "plural" is at least two, for example, two, three, etc., unless expressly limited otherwise.

As shown in background of the disclosure, polarizer has a great impact on dark state, the main factors of the polarizer affect the dark state of the LCD panel are as the following.

1. The polarizability of the polarizer itself, polarizer arrangement of the uniformity and direction angle can affect the polarizer polarizability.

2. The compensation film whether the polarizer used in the VA liquid crystal display mode, if the angle between the optical axis of the compensation film and the absorption axis of the polarizer absorption axis is not 0 degrees or 90 degrees, the polarization state of linearly polarized light passing through the polarizer will be changed to elliptically polarized light so as to be transmitted from the upper polarizer to cause light leakage, and affect dark state brightness and polarization degree.

3. Whether upper and lower absorption axis is vertical.

Figure 1:
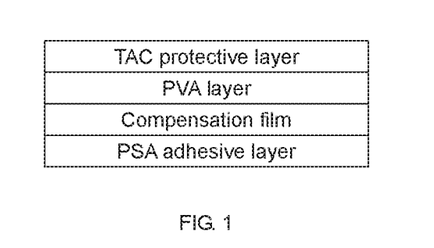
FIG. 1 is a structural schematic diagram of the polarizer in the prior art.

Referring to FIG. 1, FIG. 1 is a schematic structural diagram of a polarizer, which sequentially includes a PSA adhesive layer, a compensation film, a PVA layer and a TAC protective layer.

Figure 2:
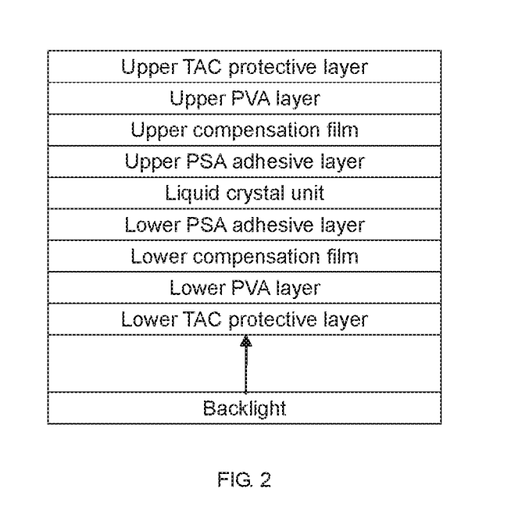
FIG. 2 is a schematic structural diagram of the liquid crystal panel in the prior art.

Referring to FIG. 2, FIG. 2 is a schematic structural diagram of a liquid crystal panel, which sequentially includes a backlight, a lower TAC protective layer, a lower PVA layer, a lower compensation film, a lower PSA adhesive layer, a liquid crystal unit, an upper PSA adhesive layer, an upper compensation film, an upper PVA layer, and an upper TAC protective layer. The visible light emitted by the backlight is polarized into linearly polarized light by the lower polarizer, passes through the liquid crystal unit, and then passes through the upper polarizer.

Figure 3:
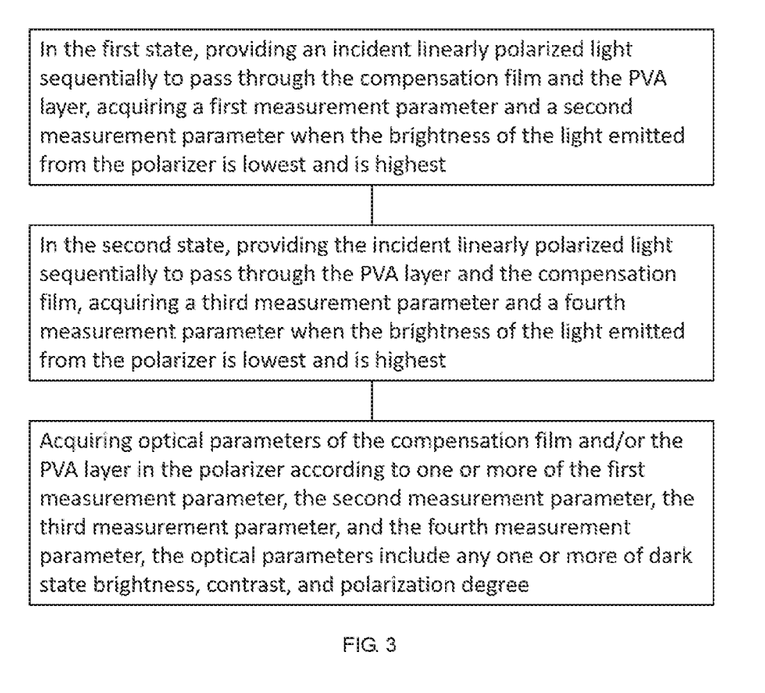
FIG. 3 is a schematic flow chart of the method for measuring optical parameters of the polarizer of the present disclosure.

As shown in FIG. 3, the present disclosure discloses a method of measuring optical parameters of a polarizer, wherein the polarizer includes a compensation film and a PVA layer, and the measuring method includes:
in the first state, providing an incident linearly polarized light sequentially to pass through the compensation film and the PVA layer, acquiring a first measurement parameter and a second measurement parameter when the brightness of light emitted from the polarizer is lowest and is highest;
in the second state, providing the incident linearly polarized light sequentially to pass through the PVA layer and the compensation film, acquiring a third measurement parameter and a fourth measurement parameter when the brightness of light emitted from the polarizer is lowest and is highest; and
acquiring optical parameters of the compensation film and/or the PVA layer in the polarizer according to one or more of the first measurement parameter, the second measurement parameter, the third measurement parameter, and the fourth measurement parameter, the optical parameters include any one or more of dark state brightness, contrast, and polarization degree.

The present disclosure is described in detail below in combination with specific embodiments.

Embodiment 1

Figure 4:
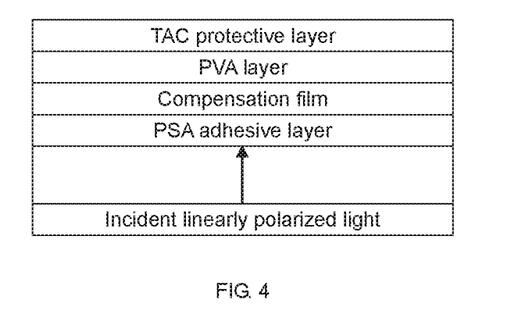
FIG. 4 and FIG. 5 are schematic diagrams of measuring the first state and the second state in Embodiment 1 of the present disclosure respectively.
Figure 5:
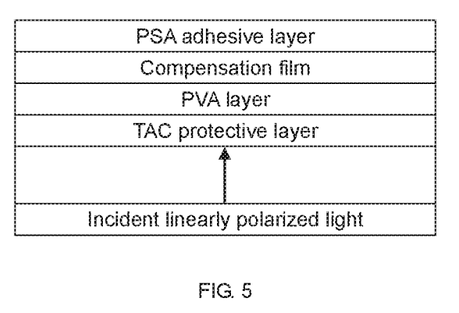

As shown in FIG. 4 and FIG. 5, the polarizer to be measured in the present embodiment includes a PSA adhesive layer, a compensation film, a PVA layer, and a TAC protective layer.

Based on the compensation film having only the inside of the PVA layer (as shown in FIG. 4), it is possible to affect the dark state brightness and the polarization degree by changing the polarization state of the incident linearly polarized light, while the outside of the PVA layer (shown in FIG. 5), it does not affect the dark state brightness and polarizer polarization, according to the principle, a measurement method can be designed to detect the effect of the compensation film and/or the PVA layer on the darkness and the polarization degree of the dark state.

As shown in FIG. 4, in the first state, providing an incident linearly polarized light sequentially to pass through the compensation film and the PVA layer, acquiring a first measurement parameter and a second measurement parameter when the brightness of light emitted from the polarizer is lowest and is highest.

As shown in FIG. 5, in the second state, providing the incident linearly polarized light sequentially to pass through the PVA layer and the compensation film, acquiring a third measurement parameter and a fourth measurement parameter when the brightness of light emitted from the polarizer is lowest and is highest.

Acquiring optical parameters of the compensation film and/or the PVA layer in the polarizer according to one or more of the first measurement parameter, the second measurement parameter, the third measurement parameter, and the fourth measurement parameter, the optical parameters include any one or more of dark state brightness, contrast, and polarization degree.

In the first state, the incident linearly polarized light passes through the compensation film and then passes through the PVA layer. When passing through the compensation film, if the angle between the optical axis of the compensation film and the absorption axis of the PVA layer is not 0 or 90 degrees, the incident linearly polarized light will become elliptically polarized light, then there will be light leakage through the PVA layer, affecting the dark state brightness and the polarization degree.

In the second state, the incident linearly polarized light passes through the PVA layer first and then passes through the compensation film. When passing through the PVA layer, the incident linearly polarized light or the linearly polarized light passes through the compensation film, even if the optical axis and the absorption axis of the PVA layer have an included angle of 0 or 90 degrees, the incident linearly polarized light will become elliptically polarized light, does not affect the light intensity, and does not affect the dark state brightness and the polarization degree.

Through the above measurement results under the two states, the effect of the compensation film and the PVA layer on dark state brightness, contrast, and polarization degree can be calculated.

Embodiment 2

Figure 6:
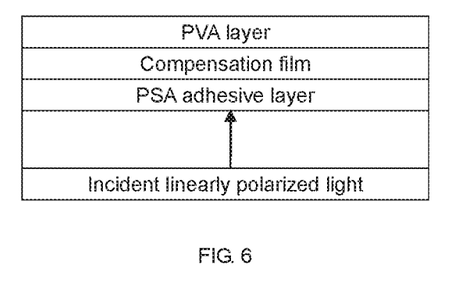
FIG. 6 and FIG. 7 are schematic diagrams of measuring the first state and the second state in Embodiment 2 of the present disclosure respectively.
Figure 7:
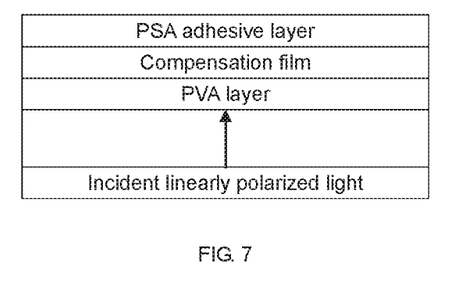

As shown in FIG. 6 and FIG. 7, The polarizer to be measured in the present embodiment includes a PSA adhesive layer, a compensation film, and a PVA layer. Compared with Embodiment 1, the polarizer in this embodiment removes the TAC protective layer, which can improve the measurement accuracy.

The measuring method is exactly the same as that in Embodiment 1, and details are not described herein again.

Embodiment 3

Figure 8:
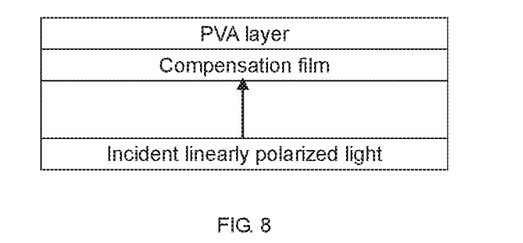
FIG. 8 and FIG. 9 are schematic diagrams of measuring the first state and the second state in Embodiment 3 of the present disclosure respectively.
Figure 9:
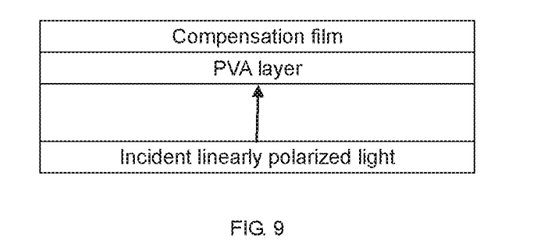

As shown in FIG. 8 and FIG. 9, the polarizer to be measured in the embodiment includes a compensation film and a PVA layer. Compared with Example 1, the polarizer in this embodiment removes the TAC protective layer and the PSA adhesive layer, which can improve the measurement accuracy.

The measuring method is exactly the same as that in Embodiment 1, and details are not described herein again.

Embodiment 4

Figure 10:
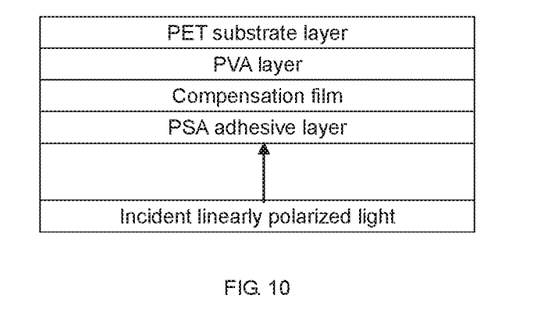
FIG. 10 and FIG. 11 are schematic diagrams of measuring the first state and the second state in Embodiment 4 of the present disclosure respectively.
Figure 11:
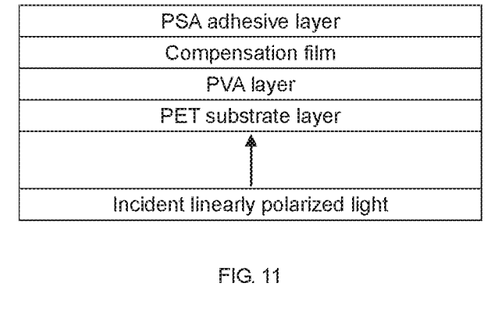

As shown in FIG. 10 and FIG. 11, the polarizer to be measured in this embodiment includes a PSA adhesive layer, a compensation film, a PVA layer, and a PET substrate layer.

The measuring method is exactly the same as that in Embodiment 1, and details are not described herein again.

Embodiment 5

The method for measuring optical parameters of a polarizer of the present embodiment includes that: the polarizer includes a compensation film and a PVA layer; and the measuring method includes:

As shown in FIG. 8, in the first state, providing an incident linearly polarized light sequentially to pass through the compensation film and the PVA layer, acquiring a first measurement parameter and a second measurement parameter when the brightness of light emitted from the polarizer is lowest and is highest. The first measurement parameter includes a dark state brightness $Lv_1$, the second measurement parameter includes a bright state brightness $Lv_2$.

As shown in FIG. 9, in the second state, providing the incident linearly polarized light sequentially to pass through the PVA layer and the compensation film, acquiring a third measurement parameter and a fourth measurement parameter when the brightness of light emitted from the polarizer is lowest and is highest. The third measurement parameter includes a dark state brightness $Lv_3$, the fourth measurement parameter includes a bright state brightness $Lv_4$.

Acquiring optical parameters of the compensation film and/or the PVA layer in the polarizer according to one or more of the first measurement parameter, the second measurement parameter, the third measurement parameter, and the fourth measurement parameter, the optical parameters include any one or more of the following:
the effect of the PVA layer on the dark state brightness is: $Lv_3$;
the effect of the PVA layer and the compensation film on the dark state brightness is: $Lv_1$;
the effect of the compensation film on the dark state brightness is: $Lv_1-Lv_3$;
the effect of the PVA layer on the contrast is: $Lv_4/Lv_3$;
the effect of the PVA layer and the compensation film on the contrast is: $Lv_2/Lv_1$;
the effect of the compensation film on the contrast is: $(Lv_4/Lv_3)-(Lv_2/Lv_1)$;
the effect of the PVA layer on the polarization degree is: $(Lv_4-Lv_3)/(Lv_3+Lv_4)$;
the effect of the PVA layer and the compensation film on the polarization degree is: $(Lv_2-Lv_1)/(Lv_1+Lv_2)$;
the effect of the compensation film on the polarization degree is: $(Lv_4-Lv_3)/(Lv_3+Lv_4)-(Lv_2-Lv_1)/(Lv_1+Lv_2)$.

Further, the measuring method in this embodiment may further includes:
in the first state, acquiring a first transmission spectrum and a second transmission spectrum when a brightness of light emitted from the polarizer is lowest and is highest; and in the second state, acquiring a third transmission spectrum and a fourth transmission spectrum when a brightness of light emitted from the polarizer is lowest and is highest.

Through the measurement of the penetration spectrum, the effect of the specific wavelength on the polarizer optical parameters can be analyzed.

Embodiment 6

The method for measuring optical parameters of a polarizer of the present embodiment includes that: the polarizer includes a compensation film and a PVA layer; and the measuring method includes the follows.

As shown in FIG. 8, in the first state, providing an incident linearly polarized light sequentially to pass through the compensation film and the PVA layer, acquiring a first measurement parameter and a second measurement parameter when the brightness of light emitted from the polarizer is lowest and is highest. The first measurement parameter includes a dark state transmittance $T_{1\perp}$ and the second measurement parameter includes a bright state transmittance $T_{2//}$.

As shown in FIG. 9, in the second state, providing the incident linearly polarized light sequentially to pass through the PVA layer and the compensation film, acquiring a third measurement parameter and a fourth measurement parameter when the brightness of light emitted from the polarizer is lowest and is highest. The third measurement parameter includes a dark state transmittance $T_{3\perp}$ and the fourth measurement parameter includes a bright state transmittance $T_{4//}$.

Acquiring optical parameters of the compensation film and/or the PVA layer in the polarizer according to one or more of the first measurement parameter, the second measurement parameter, the third measurement parameter, and the fourth measurement parameter, the optical parameters include any one or more of the following:
the effect of the PVA layer on the dark state brightness is: $T_{3\perp}$;
the effect of the PVA layer and the compensation film on the dark state brightness is: $T_{1\perp}$;
the effect of the compensation film on the dark state brightness is: $T_{1\perp}-T_{3\perp}$;
the effect of the PVA layer on the polarization degree is: $(T_{4//}-T_{3\perp})/(T_{3\perp}+T_{4//})$;
the effect of the PVA layer and the compensation film on the polarization degree is: $(T_{2//}-T_{1\perp})/(T_{1\perp}+T_{2//})$;
the effect of the compensation film on the polarization degree is: $(T_{4//}-T_{3\perp})/(T_{3\perp}+T_{4//})-\sqrt{(T_{2//}-T_{1\perp})/(T_{1\perp}+T_{2//})}$.

Embodiment 7

Figure 12:
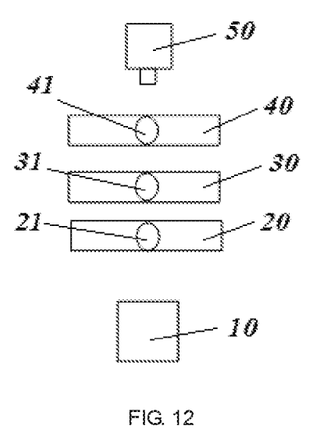
FIG. 12 is a schematic structure diagram of the polarizer optical parameter measuring device in Embodiment 7 of the present disclosure.

As shown in FIG. 12, in this embodiment, the polarizer optical parameter measurement device includes a light source 10, a first stage 20, a rotatable stage 30, a second stage 40, and a brightness meter 50 arranged along an optical path.

The first stage 20, the rotatable stage 30, and the second stage 40 are respectively provided with through holes 21, 31, and 41, so that the brightness meter 50 can receive the light emitted by the light source 10. The first stage 20 and the second stage 40 are respectively used to carry a standard polarizer. The rotatable stage 30 is used to carry the polarizer to be measured, and the three stages need to be aligned, that is, the angles are the same.

The first stage 20, the rotatable stage 30 and the second stage 40 are respectively provided with a reference edge for limiting the polarizer placed thereon. Here, the stage is square or rectangular, four sides of the stage as the reference side. In this way, the standard polarizer and the polarizer to be measured can be placed with the reference side of the polarizer in alignment with the reference side of the stage.

The rotatable stage 30 is rotatable, connected with the servo motor, and precisely controlled by a servo motor. The rotation precision can reach 0.01 degree and the rotation angle can be 0-360-degree rotation.

Brightness meter requires high-precision measurement equipment, where the choice of spectrophotometer measurements, such as CS2000, CS2000A and SR-UL2 and other spectrophotometers, along with spectral measurement.

Embodiment 8

Using the measuring apparatus in Embodiment 7, three different polarizers were measured by the method in Embodiment 6 and the results are shown in Table 2-4.

TABLE 2

Common optical parameters of PVA layer and compensation film
Linear polarized light is incident

|  | First piece | Second piece | Third piece |
| --- | --- | --- | --- |
| Parallel penetration rate | 36.6 | 36.6 | 36.6 |
| Vertical penetration rate | 0.0016 | 0.0016 | 0.0018 |
| Polarization degree | 99.9956 | 99.9955 | 99.9950 |
| Contrast | 23161 | 22588 | 19978 |

TABLE 3

Optical parameters of PVA layer
Linear polarized light incident back

|  | First piece | Second piece | Third piece |
| --- | --- | --- | --- |
| Parallel penetration rate | 36.6 | 36.6 | 36.5 |
| Vertical penetration rate | 0.0013 | 0.0013 | 0.0012 |
| Polarization degree | 99.9965 | 99.9965 | 99.9968 |
| Contrast | 28619 | 29141 | 31603 |

TABLE 4

Optical parameters of compensation film

|  | First piece | Second piece | Third piece |
| --- | --- | --- | --- |
| Vertical penetration rate | −0.0003 | −0.0004 | −0.0007 |
| Polarization degree | 0.0008 | 0.0010 | 0.0019 |
| Contrast | 5458 | 6554 | 11625 |

Through the above parameters, the PVA layer dark state performance of the three-piece polarizer is more consistent, the third piece of the compensation film on the dark state of the polarizer most affected.

It can be seen from the above technical solutions that the present disclosure has the following beneficial effects.

The measuring device of the disclosure has the advantages of simple structure, simple and easy measuring method, low cost, quickness and convenience.

The disclosure can measure the influence of the compensation film and/or the PVA layer in the polarizer on the brightness, contrast and polarization degree of the polarizer in dark state so as to improve the optical performance of the polarizer in a targeted manner.

It will be apparent to those skilled in the art that the disclosure is not limited to the details of the foregoing exemplary embodiments, but that the present disclosure may be embodied in other specific forms without departing from the spirit or essential characteristics of the disclosure. Therefore, the present embodiments are to be considered in all respects as illustrative and not restrictive, the scope of the disclosure being defined by the appended claims rather than the foregoing description. It is therefore intended to include in the disclosure all the changes which come within the meaning and range of equivalency of the claims. Any reference signs in the claims should not be construed as limiting the claim involved.

In addition, it should be understood that, although the specification is described according to the embodiments, not every embodiment includes only one independent technical solution. This description in the specification is merely for the sake of clarity. Those skilled in the art should take the description as a whole and the technical solutions in the embodiments may also be combined as appropriate to form other embodiments that can be understood by those skilled in the art.

What is claimed is:

1. A method of measuring optical parameters of a polarizer, wherein the polarizer comprises a compensation film and a PVA layer, and the measuring method comprises:
   in a first state, providing an incident linearly polarized light to pass through the compensation film and the PVA layer sequentially, acquiring a first measurement parameter and a second measurement parameter when a brightness of light emitted from the polarizer is lowest and is highest;
   in a second state, providing the incident linearly polarized light to pass through the PVA layer and the compensation film sequentially, acquiring a third measurement parameter and a fourth measurement parameter when a brightness of light emitted from the polarizer is lowest and is highest; and
   acquiring optical parameters of the compensation film and/or the PVA layer in the polarizer according to one or more of the first measurement parameter, the second measurement parameter, the third measurement parameter, and the fourth measurement parameter, the optical parameters comprise any one or more of a dark state brightness, a contrast, and a polarization degree.

2. The measuring method according to claim 1, wherein the first measurement parameter in the first state comprises a dark state brightness Lv1, the second measurement parameter in the first state comprises a bright state brightness Lv2; the third measurement parameter in the second state comprises a dark state brightness Lv3, and the fourth measurement parameter in the second state comprises a bright state brightness Lv4.

3. The measuring method according to claim 2, wherein the optical parameters comprise any one or more of the following:
   the effect of the PVA layer on the dark state brightness is: Lv3;
   the effect of the PVA layer and the compensation film on the dark state brightness is: Lv1;
   the effect of the compensation film on the dark state brightness is: Lv1−Lv3;
   the effect of the PVA layer on the contrast is: Lv4/Lv3;
   the effect of the PVA layer and the compensation film on the contrast is: Lv2/Lv1;
   the effect of the compensation film on the contrast is: (Lv4/Lv3)−(Lv2/Lv1);
   the effect of the PVA layer on the polarization degree is: (Lv4−Lv3)/(Lv3+Lv4);
   the effect of the PVA layer and the compensation film on the polarization degree is: (Lv2−Lv1)/(Lv1+Lv2);
   the effect of the compensation film on the polarization degree is: (Lv4−Lv3)/(Lv3+Lv4)−(Lv2−Lv1)/(Lv1+Lv2).

4. The measuring method according to claim 2, wherein the measuring method further comprises:

in the first state, acquiring a first transmission spectrum and a second transmission spectrum when a brightness of light emitted from the polarizer is lowest and is highest; and in the second state, acquiring a third transmission spectrum and a fourth transmission spectrum when a brightness of light emitted from the polarizer is lowest and is highest.

5. The measuring method according to claim 1, wherein the first measurement parameter in the first state comprises a dark state transmittance $T_{1\perp}$ and the second measurement parameter in the first state comprises a bright state transmittance $T_{2//}$; and the third measurement parameter in the second state comprises a dark state transmittance $T_{3\perp}$, and the fourth measurement parameter in the second state comprises a bright state transmittance $T_{4//}$.

6. The measuring method according to claim 5, wherein the optical parameters comprise any one or more of the following:

the effect of the PVA layer on the dark state brightness is: $T_{3\perp}$;

the effect of the PVA layer and the compensation film on the dark state brightness is: $T_{1\perp}$;

the effect of the compensation film on the dark state brightness is: $T_{1\perp}-T_{3\perp}$;

the effect of the PVA layer on the polarization degree is: $(T_{4//}-T_{3\perp})/(T_{3\perp}+T_{4//})$;

the effect of the PVA layer and the compensation film on the polarization degree is: $(T_{2//}-T_{1\perp})/(T_{1\perp}+T_{2//})$;

the effect of the compensation film on the polarization degree is: $(T_{4//}-T_{3\perp})/(T_{3\perp}+T_{4//})-\sqrt{(T_{2//}-T_{1\perp})/(T_{1\perp}+T_{2//})}$.

7. The measuring method according to claim 6, wherein the first measurement parameter in the first state comprises a dark state brightness Lv1, the second measurement parameter in the first state comprises a bright state brightness Lv2; the third measurement parameter in the second state comprises a dark state brightness Lv3, and the fourth measurement parameter in the second state comprises a bright state brightness Lv4.

8. The measuring method according to claim 7, wherein the optical parameters comprise any one or more of the following:

the effect of the PVA layer on the dark state brightness is: Lv3;

the effect of the PVA layer and the compensation film on the dark state brightness is: Lv1;

the effect of the compensation film on the dark state brightness is: Lv1−Lv3;

the effect of the PVA layer on the contrast is: Lv4/Lv3;

the effect of the PVA layer and the compensation film on the contrast is: Lv2/Lv1;

the effect of the compensation film on the contrast is: (Lv4/Lv3)−(Lv2/Lv1);

the effect of the PVA layer on the polarization degree is: (Lv4−Lv3)/(Lv3+Lv4);

the effect of the PVA layer and the compensation film on the polarization degree is: (Lv2−Lv1)/(Lv1+Lv2);

the effect of the compensation film on the polarization degree is: (Lv4−Lv3)/(Lv3+Lv4)−(Lv2−Lv1)/(Lv1+Lv2).

9. The measuring method according to claim 7, wherein the measuring method further comprises:

in the first state, acquiring a first transmission spectrum and a second transmission spectrum when a brightness of light emitted from the polarizer is lowest and is highest; and in the second state, acquiring a third transmission spectrum and a fourth transmission spectrum when a brightness of light emitted from the polarizer is lowest and is highest.

10. The measuring method according to claim 5, wherein the first measurement parameter in the first state comprises a dark state brightness Lv1, the second measurement parameter in the first state comprises a bright state brightness Lv2; the third measurement parameter in the second state comprises a dark state brightness Lv3, and the fourth measurement parameter in the second state comprises a bright state brightness Lv4.

11. The measuring method according to claim 10, wherein the optical parameters comprise any one or more of the following:

the effect of the PVA layer on the dark state brightness is: Lv3;

the effect of the PVA layer and the compensation film on the dark state brightness is: Lv1;

the effect of the compensation film on the dark state brightness is: Lv1−Lv3;

the effect of the PVA layer on the contrast is: Lv4/Lv3;

the effect of the PVA layer and the compensation film on the contrast is: Lv2/Lv1;

the effect of the compensation film on the contrast is: (Lv4/Lv3)−(Lv2/Lv1);

the effect of the PVA layer on the polarization degree is: (Lv4−Lv3)/(Lv3+Lv4);

the effect of the PVA layer and the compensation film on the polarization degree is: (Lv2−Lv1)/(Lv1+Lv2);

the effect of the compensation film on the polarization degree is: (Lv4−Lv3)/(Lv3+Lv4)−(Lv2−Lv1)/(Lv1+Lv2).

12. The measuring method according to claim 10, wherein the measuring method further comprises:

in the first state, acquiring a first transmission spectrum and a second transmission spectrum when a brightness of light emitted from the polarizer is lowest and is highest; and in the second state, acquiring a third transmission spectrum and a fourth transmission spectrum when a brightness of light emitted from the polarizer is lowest and is highest.

13. The measuring method according to claim 1, wherein the polarizer further comprises one or more of a substrate layer, a protective layer, and an adhesive layer.

* * * * *